US009458572B2

(12) United States Patent
Sekiya et al.

(10) Patent No.: US 9,458,572 B2
(45) Date of Patent: Oct. 4, 2016

(54) METHOD OF USING AN ANTI-SOILING AGENT COMPOSITION

(71) Applicant: MAINTECH CO., LTD., Tokyo (JP)

(72) Inventors: Hiroshi Sekiya, Tokyo (JP); Hiraku Sawada, Fuji (JP); Daisuke Kobayashi, Tokyo (JP)

(73) Assignee: MAINTECH CO., LTD., Tokyo (JP)

( * ) Notice: Subject to any disclaimer, the term of this patent is extended or adjusted under 35 U.S.C. 154(b) by 0 days.

(21) Appl. No.: 14/825,651

(22) Filed: Aug. 13, 2015

(65) Prior Publication Data
US 2015/0345080 A1 Dec. 3, 2015

Related U.S. Application Data

(62) Division of application No. 13/497,581, filed as application No. PCT/JP2011/003799 on Jul. 4, 2011, now abandoned.

(51) Int. Cl.
D21H 17/00 (2006.01)
D21H 17/06 (2006.01)
(Continued)

(52) U.S. Cl.
CPC .............. *D21H 17/72* (2013.01); *C08L 83/08* (2013.01); *C09D 5/1675* (2013.01); *D21C 9/08* (2013.01);
(Continued)

(58) Field of Classification Search
CPC ........ C08L 83/08; C08L 83/06; C08L 83/00; D21H 17/59; D21H 17/02; C08G 77/26
USPC ....................................... 525/474
See application file for complete search history.

(56) References Cited

U.S. PATENT DOCUMENTS 5,183,845 A * 2/1993 Parkinson et al. ............ 524/726
5,428,089 A * 6/1995 Ishikawa et al. ............ 252/8.84
(Continued)

FOREIGN PATENT DOCUMENTS

JP 07-292382 A 11/1995
JP 08-049185 A 2/1996
(Continued)

OTHER PUBLICATIONS

International Search Report and Written Opinion mailed on Aug. 16, 2011 for the corresponding International patent application No. PCT/JP2011/003799 (English Translation attached).
(Continued)

Primary Examiner — Mike M Dollinger
(74) Attorney, Agent, or Firm — Muncy, Geissler, Olds & Lowe, P.C.

(57) ABSTRACT

[Object] To provide an anti-soiling agent compound that can sufficiently prevents adhesion of pitch to a dry part region. [Solution] The present invention provides an anti-soiling agent composition is provided with: a low molecular polysiloxane compound represented by the following formula (1); and a high molecular polysiloxane compound represented by the following formula (2), and characterized in that the number of modified groups per low molecular polysiloxane compound is in a range from 0.1 to 3, the number of modified groups per high molecular polysiloxane compound is in a range from 1.0 to 10, and the number m of repeating polysiloxane units in the low molecular polysiloxane compound and the number n of repeating polysiloxane units in the high molecular polysiloxane compound have the following relationship: $2\ m \le n$,

[in formula (1), substituent $R^1$ represents a methyl group or a modified group, with the repeating number m being set to an integer from 20 to 200], and

[in formula (2), substituent $R^2$ represents a methyl group or a modified group, with the repeating number n representing an integer].

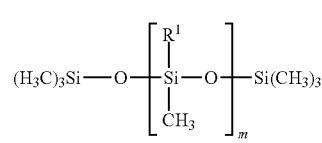

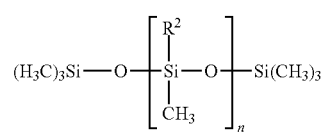

7 Claims, 1 Drawing Sheet

(51) Int. Cl.
*D21H 17/59* (2006.01)
*D21H 21/02* (2006.01)
*D21C 9/08* (2006.01)
*D21H 21/04* (2006.01)
*C08L 83/08* (2006.01)
*C09D 5/16* (2006.01)
*C08L 83/06* (2006.01)
*C08G 77/04* (2006.01)
*C08G 77/14* (2006.01)
*C08G 77/388* (2006.01)
*C08G 77/46* (2006.01)
*C08G 77/00* (2006.01)

(52) U.S. Cl.
CPC ............... *D21C 9/083* (2013.01); *D21C 9/086* (2013.01); *D21H 17/06* (2013.01); *D21H 17/59* (2013.01); *D21H 21/02* (2013.01); *D21H 21/04* (2013.01); *C08G 77/045* (2013.01); *C08G 77/14* (2013.01); *C08G 77/388* (2013.01); *C08G 77/46* (2013.01); *C08G 77/80* (2013.01); *C08L 83/06* (2013.01)

(56) References Cited

U.S. PATENT DOCUMENTS

| | | |
|---|---|---|
| 6,294,608 B1 * | 9/2001 | Hager et al. .................. 524/838 |
| 2006/0162888 A1 | 7/2006 | Sekiya et al. |
| 2006/0205861 A1 * | 9/2006 | Gordon et al. ............... 524/506 |
| 2009/0105100 A1 * | 4/2009 | Ferrar et al. .................. 508/107 |

FOREIGN PATENT DOCUMENTS

| | | |
|---|---|---|
| JP | 11-217786 A | 8/1999 |
| JP | 2002-256214 A | 9/2002 |
| JP | 2003-213587 A | 7/2003 |
| JP | 2004-98306 A | 4/2004 |
| JP | 2010-100697 A | 5/2010 |
| WO | 2010/047409 A1 | 4/2010 |

OTHER PUBLICATIONS

Office Action mailed Sep. 26, 2011 issued in corresponding JP patent application No. 2011-535816 (English translation attached).
Notice of Allowance mailed Nov. 9, 2011 issued in corresponding JP application No. 2011-535816 (English translation attached).

* cited by examiner

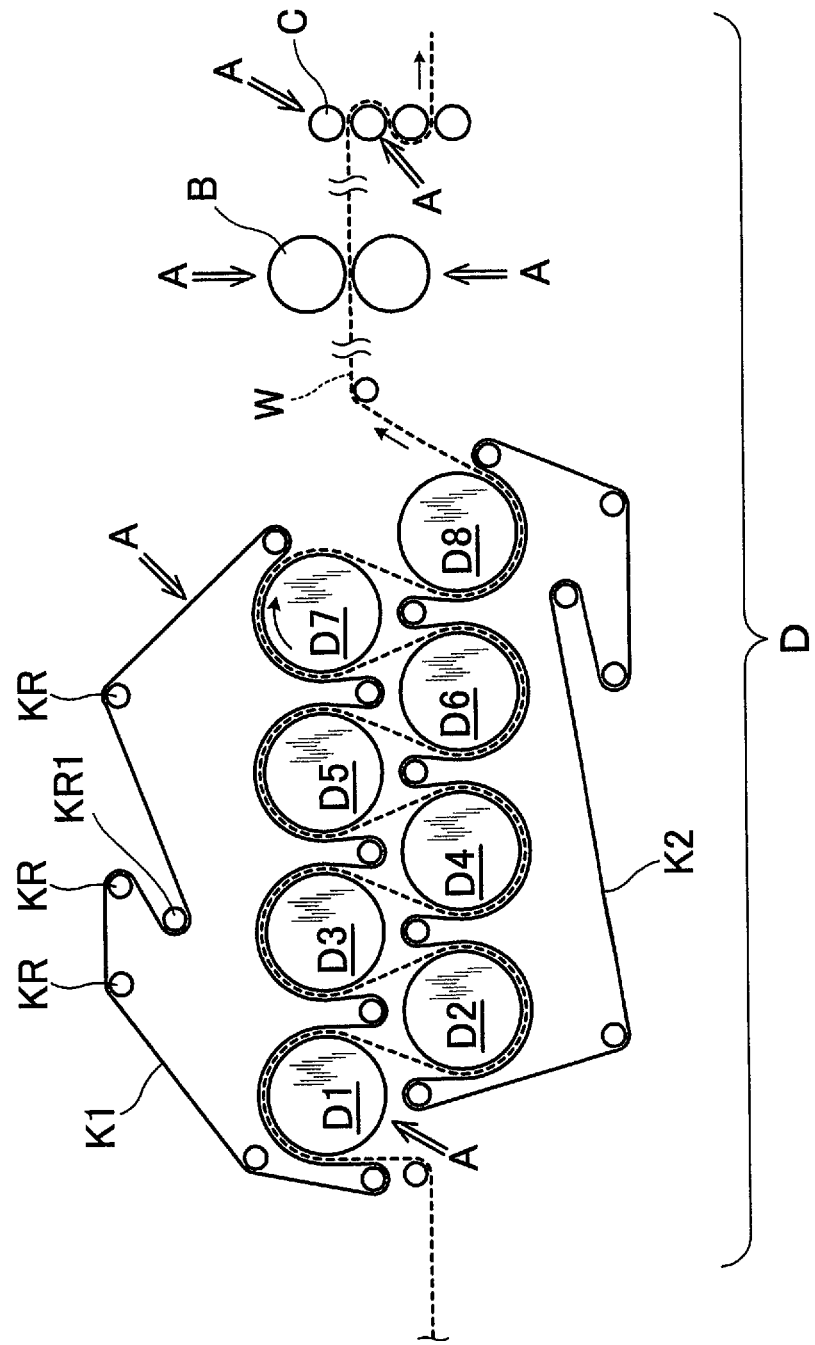

METHOD OF USING AN ANTI-SOILING AGENT COMPOSITION

CROSS REFERENCE TO RELATED APPLICATIONS

This application is a divisional of U.S. application Ser. No. 13/497,581, filed on Mar. 22, 2012 which is a U.S. national stage of PCT/JP2011/003799 filed on Jul. 4, 2011.

TECHNICAL FIELD

The present invention relates to an anti-soiling agent composition, and more specifically concerns such an anti-soiling agent composition as to sufficiently prevent pitch contamination in a dry part.

BACKGROUND ART

A paper-making process for producing paper is generally provided with a wire part in which a liquid prepared by dispersing pulp fibers in water is mounted on a net (wire) so that excessive water is allowed to naturally drop down so as to prepare wet paper, a press part that allows the wet paper to pass between paired press rolls so that by pressing it between the pressing rolls with a felt being interpolated therebetween so as to transfer moisture in the wet paper onto the felt so that the wet paper is dehydrated, a dry part that makes the wet paper that has passed through the pressing device in contact with a heated cylinder to be dried to form paper, and a reel part that winds and takes up the paper onto a rod referred to as a spool.

In the dry part, a problem is raised in that pitch tend to adhere to the surface of each of a cylinder, a canvas, a calender roll, a breaker stack roll, etc. (which are collectively referred to as "dry part regions"). When the pitch adhere to these, paper is contaminated, resulting in serious degradation of the yield.

In view of this problem, a stain adhesion preventive agent for preventing the pitch adhesion has been known (for example, see Patent Document 1). Such a stain adhesion preventive agent has a composition containing a silicone oil and a fluorine-based surfactant whose viscosities are different from each other.

Moreover, an anti-soiling agent composition for a paper-making machine, which is supplied and applied to a paper-making machine, and mainly composed of a side-chain type modified silicone oil or a side-chain/two-terminal type modified silicone oil, has been known (see Patent Document 2). In this anti-soiling agent composition, the side-chain type modified silicone oil has its side chains substituted with an amino group or an epoxy group.

PRIOR ART DOCUMENTS

Patent Documents

[Patent Document 1] Japanese Patent Application Laid-Open No. 7-292382
[Patent Document 2] Japanese patent No. 3388450

SUMMARY OF THE INVENTION

Problems that the Invention is to Solve

In the stain adhesion preventive agent described in Patent Document 1, however, since the viscosity of the mixed silicone oil is too high, and since the silicone oil itself exerts stickiness, it is not possible to sufficiently prevent adhesion of pitch to the dry part regions.

Moreover, since the anti-soiling agent composition described in Patent Document 2 exerts a high fixability to the roll or the like of a paper-making machine, it is possible to give mold-releasing and water-repellant properties to a roll or the like immediately after the application thereto; however, this composition is not sufficient from the viewpoint of preventing the pitch adhesion.

In view of the above-mentioned circumstances, the present invention has been devised, and its object is to provide an anti-soiling agent composition that can sufficiently prevent pitch from adhering to the dry part regions.

Means for Solving the Problems

In order to solve the above-mentioned problems, the present inventors, etc. have extensively studied and found that by adding a low-molecular-weight polysiloxane compound having an extremely low molecular weight to a high molecular polysiloxane compound, the above-mentioned problems can be solved, and have completed the present invention.

The present invention relates to (1) an anti-soiling agent compound having a low molecular polysiloxane compound represented by the following formula (1) and a high molecular polysiloxane compound represented by the following formula (2), and is characterized in that the number of modified groups per low molecular polysiloxane compound is in a range from 0.1 to 3, the number of modified groups per high molecular polysiloxane compound is in a range from 1.0 to 10, and the number m of repeating polysiloxane units in the low molecular polysiloxane compound and the number n of repeating polysiloxane units in the high molecular polysiloxane compound are allowed to satisfy the following relationship: $2\,m \le n$,

[Formula 1]

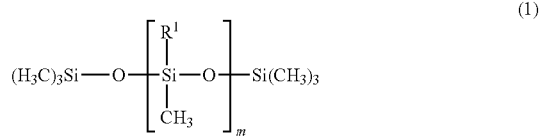

[in formula (1), substituent $R^1$ represents a methyl group or a modified group, with the repeating number m being set to an integer from 20 to 200], and

[Formula 2]

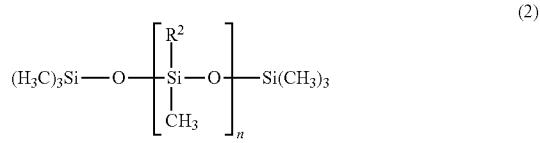

[in formula (2), substituent $R^2$ represents a methyl group or a modified group, with the repeating number n representing an integer].

The present invention relates to (2) the anti-soiling agent composition described in the (1) in which the modified group in the low molecular polysiloxane compound is at least one member selected from the group consisting of an amino-modified group, an epoxy-modified group, a polyether-modified group, a carboxyl-modified group and a phenyl-modified group.

The present invention relates to (3) the anti-soiling agent composition described in the (1) in which the modified group in the low molecular polysiloxane compound is represented by the following formula (3):

[Formula 3]

—R³—NH—R⁴—NH₂ (3)

[in formula (3), each of substituent $R^3$ and substituent $R^4$ represents an alkylene group having 1 to 6 carbon atoms independently].

The present invention relates to (4) the anti-soiling agent composition described in the (3) in which each of substituent $R^3$ and substituent $R^4$ represents an ethylene group or a propylene group.

The present invention relates to (5) the anti-soiling agent composition described in the (3) in which a substituent $R^3$ represents a propylene group and a substituent $R^4$ represents an ethylene group.

The present invention relates to (6) the anti-soiling agent composition described in the (1) in which the modified group in the low molecular polysiloxane compound is represented by the following formula (4):

[Formula 4]

—R⁵—NH₂ (4)

[in formula (4), a substituent $R^5$ represents an alkylene group having 1 to 6 carbon atoms].

The present invention relates to (7) the anti-soiling agent composition described in any one of the (1) to (6) in which the modified group in the high molecular polysiloxane compound is at least one member selected from the group consisting of an amino-modified group, an epoxy-modified group, a polyether-modified group, a carboxyl-modified group and a phenyl-modified group.

The present invention relates to (8) the anti-soiling agent composition described in any one of the (1) to (6) in which the modified group in the high molecular polysiloxane compound is represented by the following formula (5):

[Formula 5]

—R⁶—NH—R⁷—NH₂ (5)

[in formula 5, each of substituent $R^6$ and substituent $R^7$ represents an alkylene group having 1 to 6 carbon atoms independently].

The present invention relates to (9) the anti-soiling agent composition described in the (8) in which each of substituent $R^6$ and substituent $R^7$ represents an ethylene group or a propylene group independently.

The present invention relates to (10) the anti-soiling agent composition described in the (8) in which a substituent $R^6$ represents a propylene group and a substituent $R^7$ represents an ethylene group independently.

The present invention relates to (11) the anti-soiling agent composition described in any one of the (1) to (6) in which the modified group in the high molecular polysiloxane compound is represented by the following formula (6):

[Formula 6]

—R⁸—NH₂ (6)

[in formula (6), a substituent $R^8$ represents an alkylene group having 1 to 6 carbon atoms].

The present invention relates to (12) the anti-soiling agent composition described in any one of the (1) to (11) in which in the high molecular polysiloxane compound, the number n of repeating polysiloxane units is an integer of less than 1430.

The present invention relates to (13) the anti-soiling agent composition described in any one of the (1) to (12) which prevents pitch contamination in a dry part in a paper-making process.

The present invention relates to (14) the anti-soiling agent composition described in any one of the (1) to (12) which is applied to a canvas of a dry part for use therein, and in which the number m of repeating polysiloxane units in the low molecular polysiloxane compound is an integer in a range from 20 to 50, and the number n of repeating polysiloxane units in the high molecular polysiloxane compound is an integer in a range from 40 to 280.

The present invention relates to (15) the anti-soiling agent composition described in any one of the (1) to (12) which is applied to a cylinder of a dry part for use therein, and in which the number m of repeating polysiloxane units in the low molecular polysiloxane compound is an integer in a range from 20 to 50, and the number n of repeating polysiloxane units in the high molecular polysiloxane compound is an integer of 280 or more.

The present invention relates to (16) the anti-soiling agent composition described in any one of the (1) to (15) in which the low molecular polysiloxane compound has a compounding ratio in a range from 0.25 to 10 parts by weight relative to 1 part by weight of the high molecular polysiloxane compound.

Advantage of the Invention

An anti-soiling agent composition of the present invention includes a low molecular polysiloxane compound represented by formula (1) and a high molecular polysiloxane compound represented by formula (2), and in this structure, the number of modified groups per molecule of low molecular polysiloxane compound and high molecular polysiloxane compound is set in the above-mentioned range, and the number m and number n of repeating polysiloxane units in the two compounds are designed to satisfy the following relationship: 2 m≤n so that by applying the resultant anti-soiling agent composition to a dry part region, the high molecular polysiloxane compound exerts an effect for preventing pitch adhesion thereto, while the low molecular polysiloxane compound exerts an effect for dispersing the pitch. With this arrangement, the pitch adhesion to the dry part region can be sufficiently prevented. Additionally, in the present specification, the pitch includes adhesive solid matters, aggregates of paper powder, etc, generated in the paper-making process.

In this case, the modified group in the low molecular polysiloxane is preferably an amino-modified group, an epoxy-modified group, a polyether-modified group, a carboxyl-modified group, or a phenyl-modified group, and the modified group in the high molecular polysiloxane is preferably an amino-modified group, an epoxy-modified group, a polyether-modified group, a carboxyl-modified group, or a phenyl-modified group.

In the case when the modified group in the low molecular polysiloxane compound has a structure represented by formula (3) or formula (4), the anti-soiling agent compound of the present invention exerts an improved pitch dispersing effect.

In the case when the modified group in the high molecular polysiloxane compound has a structure represented by formula (5) or formula (6), the anti-soiling agent compound of the present invention positively exerts an improved fixability of the coat film.

In the case when the number n of repeating polysiloxane units in the high molecular polysiloxane compound is an integer of less than 1430, the flowability of the anti-soiling agent composition is improved so that easy handling is achieved.

The anti-soiling agent composition of the present invention is desirably used for preventing pitch contamination in the dry part in a paper-making process.

In particular, in the case when the number m of repeating polysiloxane units in the low molecular polysiloxane compound is an integer in a range from 20 to 50 and the number n of repeating polysiloxane units in the high molecular polysiloxane compound is an integer in a range from 40 to 280, the effect of pitch contamination prevention is positively exerted even when the application subject is a fibrous matter from which pitch is hardly separated. For this reason, the resultant composition becomes more effective when applied to be used for the canvas of the dry part.

Moreover, in the case when the number m of repeating polysiloxane units in the low molecular polysiloxane compound is an integer in a range from 20 to 50 and the number n of repeating polysiloxane units in the high molecular polysiloxane compound is an integer of 280 or more, the effect of pitch contamination prevention is positively exerted even when the application subject has a high temperature. For this reason, the resultant composition becomes more effective when applied to be used for the cylinder of the dry part having a high temperature.

In the case when the low molecular polysiloxane compound has a compounding ratio in a range from 0.25 to 10 parts by weight relative to 1 part by weight of the high molecular polysiloxane compound, the anti-soiling agent composition of the present invention makes it possible to effectively prevent pitch adhesion onto the dry part region.

BRIEF DESCRIPTION OF THE DRAWINGS

FIG. 1 is a schematic view that illustrates a dry part region of a dry part to which the anti-soiling agent composition of the present invention is applied.

MODE FOR CARRYING OUT THE INVENTION

Referring to the drawing on demand, the following description will discuss preferable embodiments of the present invention in detail. Additionally, the positional relationships between upper and lower sides as well as between right and left sides are defined as the positional relationships shown in the drawing, unless otherwise indicated. Moreover, the dimensional ratios of the drawings are not intended to be limited by the ratios shown in the drawings.

The anti-soiling agent composition in accordance with the present embodiment contains a low molecular polysiloxane compound, a high molecular polysiloxane compound, an emulsifier that emulsifies the low molecular polysiloxane compound and the high molecular polysiloxane compound, and water.

When the anti-soiling agent composition in accordance with the present invention is applied to a dry part region, the high molecular polysiloxane compound forms a coat film on the dry part region to prevent pitch from adhering thereto, and the low molecular polysiloxane compound exerts such a function as to disperse the pitch so as not to produce pitch lumps.

For this reason, these functions of the anti-soiling agent composition make it possible to sufficiently prevent the pitch from adhering to the dry part region.

The low molecular polysiloxane compound is represented by the following formula (1)

[Formula 7]

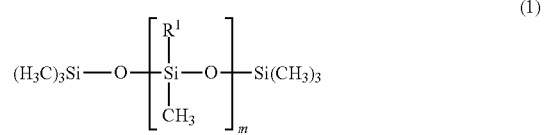

(1)

In the low molecular polysiloxane compound represented by formula (1), a substituent $R^1$ represents a methyl group or a modified group. Additionally, the modified group does not include a methyl group.

In the low molecular polysiloxane compound, the methyl group and the modified group may be mixed in one molecule of the low molecular polysiloxane compound. Moreover, a low molecular polysiloxane compound in which all the substituents $R^1$ are methyl groups and a low molecular polysiloxane compound in which all the substituents $R^1$ are modified groups may be used in a mixed manner.

As the modified group in the low molecular polysiloxane compound, an amino-modified group, an epoxy-modified group, a polyether-modified group, a carboxyl-modified group or a phenyl-modified group is proposed. Additionally, these modified groups may be mutually combined with one another.

Among these, the modified group in the low molecular polysiloxane compound is preferably an amino-modified group, and the modified group is more preferably a modified group represented by the following formula (3) or a modified group represented by the following formula (4), and most preferably, the modified group is a modified group represented by the formula (3). In this case, although the reason has not been clarified, the amino-alkylene group exerts an effect for dispersing pitch so that the pitch adhesion onto the dry part region is positively prevented.

[Formula 8]

$$—R^3—NH—R^4—NH_2 \qquad (3)$$

In formula (3), each of substituent $R^3$ and substituent $R^4$ represents an alkylene group having 1 to 6 carbon atoms. That is, the substituent $R^2$ and substituent $R^3$ may be the same as or different from each other as long as they have 1 to 6 carbon atoms.

Among these, each of substituent $R^3$ and substituent $R^4$ is preferably an ethylene group or a propylene group independently, and more preferably, the substituent $R^3$ is a propylene group and the substituent $R^4$ is an ethylene group.

[Formula 9]

$$—R^5—NH_2 \qquad (4)$$

In formula (4), substituent $R^5$ represents an alkylene group having 1 to 6 carbon atoms.

Among these, the substituent $R^5$ is preferably a propylene group.

The number of modified groups per molecule of the low molecular polysiloxane is preferably in a range from 0.1 to 3.0, and preferably from 0.5 to 2.0.

When the number of the modified groups is less than 0.1, the effect for dispersing pitch is not obtained, and when the number of the modified groups exceeds 3.0, the ionic property becomes higher, and a gelation tends to occur during evaporation of moisture from the anti-soiling agent composition, with the result that more pitch might be adhered.

In the present specification, "the number of amino-modified groups per molecule" refers to an average number of amino-modified groups contained in one molecule, which more specifically represents a value obtained by dividing the total number of amino-modified groups by the number of the molecules. That is, in the case when the number of amino-modified groups per molecule is 0.1, this means that the total number of amino-modified groups contained in 10 molecules is one.

In the low molecular polysiloxane compound, the repeating number m of polysiloxane units is an integer of from 20 to 200, preferably, from 20 to 100, and more preferably, from 20 to 50.

In the case when the repeating number m of the polysiloxane units is less than 20, a disadvantage that the volatility becomes higher tends to occur, and in the case when the repeating number m of the polysiloxane units exceeds 200, the pitch dispersing characteristic is lowered.

The kinematic viscosity at 25° C. of the low molecular polysiloxane compound is preferably from 10 to 300 mm²/s When the kinematic viscosity is less than 10 mm²/s, a disadvantage that the applied low molecular polysiloxane compound does not stay on the dry part region is caused in comparison with the structure in which the kinematic viscosity is set within the above-mentioned range, and when the kinematic viscosity exceeds 300 mm²/s, it becomes difficult to sufficiently disperse pitch in comparison with the structure in which the kinematic viscosity is set within the above-mentioned range.

The high molecular polysiloxane compound is represented by the following formula (2)

[Formula 10]

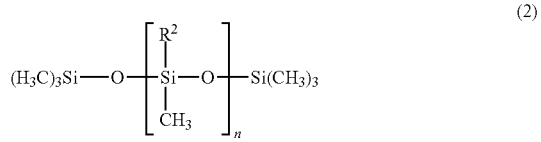

(2)

In the high molecular polysiloxane compound represented by formula (2), a substituent $R^2$ represents a methyl group or a modified group. Additionally, the modified group does not include a methyl group.

In the high molecular polysiloxane compound, the methyl group and the modified group may be mixed in one molecule of the high molecular polysiloxane compound. Moreover, a high molecular polysiloxane compound in which all the substituents $R^2$ are methyl groups and a high molecular polysiloxane compound in which all the substituents $R^2$ are modified groups may be used in a mixed manner As the modified group in the high molecular polysiloxane compound, an amino-modified group, an epoxy-modified group, a polyether-modified group, a carboxyl-modified group or a phenyl-modified group is proposed. Additionally, these modified groups may be mutually combined with one another.

Among these, the modified group in the high molecular polysiloxane compound is preferably an amino-modified group, and the modified group is more preferably a modified group represented by the following formula (5) or a modified group represented by the following formula (6). In this case, although the reason has not been clarified, the compatibility to a low molecular polysiloxane compound having a similar modified group is improved so that the high molecular polysiloxane compound and low molecular polysiloxane compound exert an improved fixability of the coat film onto dry part region.

[Formula 11]

In formula (5), each of substituent $R^6$ and substituent $R^7$ represents an alkylene group having 1 to 6 carbon atoms. That is, the substituent $R^6$ and substituent $R^7$ may be the same as or different from each other as long as they are alkylene groups having 1 to 6 carbon atoms.

Among these, each of substituent $R^6$ and substituent $R^7$ is preferably an ethylene group or a propylene group independently, and more preferably, the substituent $R^6$ is a propylene group and the substituent $R^7$ is an ethylene group.

[Formula 12]

In formula (6), substituent $R^8$ represents an alkylene group having 1 to 6 carbon atoms.

Among these, the substituent $R^8$ is preferably a propylene group.

The number of modified groups per molecule of the high molecular polysiloxane is preferably in a range from 1.0 to 10.0, and preferably from 1.0 to 6.0.

When the number of the modified groups is less than 1.0, the fixability of the coat film becomes insufficient, and when the number of the modified groups exceeds 6.0, stickiness of the compound increases, resulting in a defect that more pitch adhesion tends to occur.

In the high molecular polysiloxane compound, the repeating number n of polysiloxane units is an integer of 1430 or less, and preferably, an integer of from 40 or more to less than 1430.

In the case when the repeating number n of the polysiloxane units is 1430 or more, a high molecular polysiloxane compound having a high viscosity becomes sticky and adheres to the surface of the dry part region, resulting in a defect that more pitch tends to easily adhere thereto. Moreover, in the anti-soiling agent composition of the present invention, when the number n of repeating polysiloxane units in the high molecular polysiloxane compound is an integer of 1430 or less, the flowability of the anti-soiling agent composition is improved so that easy handling is achieved.

The kinematic viscosity at 25° C. of the high molecular polysiloxane compound is preferably from 40 to 90000 mm²/s.

When the kinematic viscosity is less than 40 mm²/s, a disadvantage arises in which the coat film of the high molecular polysiloxane is hardly formed on the dry part region in comparison with the structure in which the kinematic viscosity is set within the above-mentioned range, and when the kinematic viscosity exceeds 90000 mm$^2$/s, gumming tends to occur during evaporation of moisture from the anti-soiling agent composition to cause stickiness and subsequent stains on paper, in comparison with the structure in which the kinematic viscosity is set within the above-mentioned range.

In this case, since the material for a canvas of the dry part is a fibrous matter from which the pitch is hardly separated, the number m of repeating polysiloxane units in the low molecular polysiloxane compound is preferably an integer from 20 to 50 and the number n of repeating polysiloxane units in the high molecular polysiloxane compound is preferably an integer from 40 to 280. In this structure, the pitch contamination preventive effect is positively exerted on the canvas.

Moreover, since the cylinder of the dry part has a high temperature, the number m of repeating polysiloxane units in the low molecular polysiloxane compound is preferably an integer from 20 to 50, and the number n of repeating polysiloxane units in the high molecular polysiloxane compound is preferably an integer of 280 or more. In this case, since a coat film can be formed even on a cylinder having a high temperature, the pitch contamination preventing effect can be positively exerted. When the aforementioned stickiness is taken into consideration, the number n of repeating polysiloxane units in the high molecular polysiloxane compound is preferably set in a range from 280 or more to 1430 or less.

In the anti-soiling agent composition, the number m of repeating polysiloxane units in the low molecular polysiloxane compound and the number n of repeating polysiloxane units in the high molecular polysiloxane compound are designed to satisfy the following relationship:

$$2m \leq n.$$

That is, the number n of repeating polysiloxane units in the high molecular polysiloxane compound is set to two times or more greater than the number m of repeating polysiloxane units in the low molecular polysiloxane compound.

In the anti-soiling agent composition, although the number m of repeating units of the low molecular polysiloxane compound is set to an integer from 20 to 200 from the viewpoint of dispersibility of pitch, the number n of repeating units of the high molecular polysiloxane compound is not necessarily set to any integer as long as it is a positive integer, and since it is necessary to exert a behavior different from that of the low molecular polysiloxane, that is, an improved fixability of a coat film, the number thereof needs to have a difference of two times or more.

With this arrangement, by applying the anti-soiling agent composition to the dry part region, the low molecular polysiloxane compound is allowed to exert a pitch dispersing effect and the high molecular polysiloxane compound forms a coat film to exert an effect for preventing pitch adhesion.

The anti-soiling agent composition relating to the present embodiment contains an emulsifier.

When an emulsifier is contained therein, the low molecular polysiloxane compound and the high molecular polysiloxane compound are allowed to have an improved emulsification stability.

Examples of the emulsifier include surfactants that emulsify the high molecular polysiloxane compound and the low molecular polysiloxane compound.

Among these, the emulsifier is preferably prepared as a nonionic surfactant, and more preferably, as polyethylene decyl ether, polyethylene cetyl ether, or polyethylene stearyl ether.

In the case when the emulsifier is prepared as any of these compounds, the resulting high molecular polysiloxane compound and low molecular polysiloxane compound not only have an improved emulsification stability, but also prevent discoloration of paper.

In the case when paper such as colored corrugated cardboard is produced by a paper-making machine, if low polyethylene alkyl ether having a low-molecular-weight alkyl group is used as an emulsifier, the color of paper is separated to cause a problem of discolored spots on paper. However, when polyethylene alkyl ether having a decyl group, a cetyl group or a stearyl group as an alkyl group is used as the emulsifier, discoloration can be suppressed.

In the anti-soiling agent composition, the compounding ratio of the high molecular polysiloxane compound is preferably set to 1 to 20% by weight from the viewpoint of preventing pitch adhesion.

In the case when the compounding ratio of the high molecular polysiloxane compound is less than 1% by weight, the resulting composition tends to fail to sufficiently form a coat film in comparison with the structure in which the compounding ratio of the high molecular polysiloxane compound is set in the above-mentioned range, and in the case when the compounding ratio of the high molecular polysiloxane compound exceeds 20% by weight, the anti-soiling agent composition tends to cause a high tacking characteristic with the result that the paper surface might have wrinkles, in comparison with the structure in which the compounding ratio of the high molecular polysiloxane compound is set in the above-mentioned range.

In the anti-soiling agent composition, the compounding ratio of the low molecular polysiloxane compound is preferably set to 5 to 20% by weight from the viewpoint of pitch dispersion.

In the case when the compounding ratio of the low molecular polysiloxane compound is less than 5% by weight, the resulting composition tends to fail to sufficiently disperse pitch in comparison with the structure in which the compounding ratio of the low molecular polysiloxane compound is set in the above-mentioned range, and in the case when the compounding ratio of the low molecular polysiloxane compound exceeds 20% by weight, the pitch dispersion effect is saturated to cause a problem of high costs.

The compounding ratio of the low molecular polysiloxane compound relative to one part by weight of the high molecular polysiloxane compound is preferably set in a range of from 0.1 to 10 parts by weight, and more preferably, from 0.2 to 9 parts by weight. In the case when the compounding ratio of the low molecular polysiloxane compound relative to one part by weight of the high molecular polysiloxane compound is less than 0.1% by weight, the stickiness of the anti-soiling agent composition itself becomes high, with the result that the composition sometimes cannot be uniformly applied to the dry part, in comparison with the structure in which the compounding ratio thereof is set within the above-mentioned range, and in the case when the compounding ratio of the low molecular polysiloxane compound relative to one part by weight of the high molecular polysiloxane compound exceeds 10% by weight, the coat film is not fixed on the surface of the dry part region with the result that the dispersed pitch might be again adhered thereto, in comparison with the structure in which the compounding ratio thereof is set within the above-mentioned range.

The compounding ratio of an emulsifier to 1 part by weight of a mixture of the high molecular polysiloxane compound and the low molecular polysiloxane compound is preferably set from 0.05 to 0.4 parts by weight, and more preferably, from 0.1 to 0.2 parts by weight.

In the case when the compounding ratio of the emulsifier is less than 0.05 parts by weight, the emulsification stability tends to become insufficient in comparison with a structure having the compounding ratio of the emulsifier within the above-mentioned range, while in the case when the compounding ratio of the emulsifier exceeds 0.4 parts by weight, a problem arises in which the degree of discoloration of paper becomes greater in comparison with the structure having the compounding ratio of the emulsifier within the above-mentioned range.

In addition to these, the anti-soiling agent composition of the present embodiment may contain additives, such as a chelating agent, a pH adjusting agent, an antiseptic agent, a viscosity adjusting agent, a lubricating agent, a wetting agent, a dusting inhibitor, a mold releasing agent, an adhesive agent, a surface modifying agent, a cleaning agent, a paper strength reinforcing agent, a sizing agent, a yield improving agent, a water repellent agent, an oil repellent agent, an anti-slipping agent, a lubricant, a softener, etc.

Examples of the lubricating agent include: mineral oils, such as gear oil, cylinder oil, turbine oil and spindle oil; plant oils, such as coconut oil, linseed oil, castor oil, rapeseed oil and corn oil; paraffins, such as fluidizing paraffin and iso-paraffin; and synthesized oils, such as polyisobutylene, polybutene, maleated polybutene, polyethylene wax and microwax.

The following description will discuss a method of preparing an anti-soiling agent composition in accordance with the present embodiment.

The anti-soiling agent composition is prepared through processes in which a high molecular polysiloxane compound, a low molecular polysiloxane compound and an emulsifier are added to water and these are then stirred so that the high molecular polysiloxane compound and the low molecular polysiloxane compound are emulsified to produce an anti-soiling agent composition.

Such a stirring process is carried out by using a mixer, a homogenizer, a mill or the like, on demand.

The following description will discuss a method of using the anti-soiling agent composition on a dry part.

FIG. 1 is a schematic view that illustrates a dry part region of a dry part to which an anti-soiling agent composition in accordance with the present invention is applied.

As shown in FIG. 1, the anti-soiling agent composition is used for a dry part D.

The dry part D is provided with a paper body W, a plurality of cylinders D1, D2, D3, D4, D5, D6, D7 and D8 (hereinafter, referred to "D1 to D8"), each having a cylindrical shape, which are used for heating and drying the paper body W, canvases K1 and K2 for use in pressing the paper body onto the cylinders D1 to D8, a canvas roll KR that guides the canvases K1 and K2, breaker stack rolls B that gently adjust the flatness and paper thickness of the dried paper body W, and a calender roll C that adjusts the flatness and paper thickness of the dried paper body W.

In the dry part D, the paper body W is pressed onto the surfaces of the rotating cylinders D1 to D8 by the canvases K1 and K2. Thus, the paper body W is allowed to adhere to the cylinders D1 to D8 so as to be simultaneously heated and dried.

Thereafter, the paper body W is sandwiched by the breaker stack rolls B, and then made into a high-density state by the calender roll C.

In a using method of the anti-soiling agent composition, as shown in FIG. 1, to the cylinders D1 to D8, the canvases K1 and K2, the breaker stack rolls B and the calender roll C of the dry part D, the anti-soiling agent composition is directly applied respectively at positions indicated by arrows A.

In this case, the applying method of the anti-soiling agent composition is not particularly limited, and for example, by using a scattering nozzle or the like, a liquid-state shower system, a mist-state atomizing system or the like is used. At this time, the anti-soiling agent composition may be sprayed while the scattering nozzle is being slid in a paper width direction. By spraying the anti-soiling agent composition over the dry part, the pitch contamination can be prevented.

At this time, the sprayed amount of the anti-soiling agent composition per unit area of paper passing therethrough is preferably set in a range from 10 $\mu g/m^2$ to 10000 $\mu g/m^2$, and more preferably from 30 $\mu g/m^2$ to 1000 $\mu g/m^2$, as a solid component of the polysiloxane compound.

When the sprayed amount is less than 10 $\mu g/m^2$, the anti-soiling agent composition is not sufficiently adhered to the surface of the dry part region, with the result that the pitch adhesion is not sufficiently suppressed, in comparison with the structure in which the sprayed amount is set within the above-mentioned range. Moreover, when the sprayed amount exceeds 10000 $\mu g/m^2$, the excessive portion is accumulated on the surface of the dry part region, with the result that pitch is involved therein to increase stains and the meshes of the canvases tend to be clogged, in comparison with the structure in which the sprayed amount is set within the above-mentioned range.

Although preferred embodiments of the present invention have been explained above, the present invention is not intended to be limited by the above-mentioned embodiments.

For example, although the anti-soiling agent composition relating to the present embodiment contains an emulsifier, the emulsifier is not necessarily required to be contained when the high molecular polysiloxane compound and the low molecular polysiloxane compound are water soluble.

In the anti-soiling agent composition relating to the present embodiment, although the low molecular polysiloxane compound (formula (1)) and the high molecular polysiloxane compound (formula (2)) have methyl groups, some of the methyl groups may be substituted with an epoxy-modified group, an alkyl group (except for a methyl group), a polyether group, a carboxyl group or an aralkyl group. Only one kind of these may be included in a molecule, or a plurality of kinds thereof may be mixed therein.

Additionally, as the epoxy-modified group, an epoxy alkyl group or an epoxy polyether group is proposed.

In the anti-soiling agent composition of the present embodiment, the anti-soiling agent compound is applied to the dry part region in the dry part; however, the composition may be applied not only to the dry part, but also to the press part and the reel part.

EXAMPLES

The following description will discuss the present invention in detail based upon examples and reference examples; however, the present invention is not intended to be limited by these examples.

Examples 1 to 15 and Comparative Examples 1 to 8

To water were added 6.0% by weight of a low molecular polysiloxane compound represented by the following formula (1), 4.0% by weight of a high molecular polysiloxane compound represented by the following formula (2) and 2.0% by weight of polyethylene decyl ether (emulsifier), and stirred by a mixer so that an anti-soiling agent composition was obtained.

Table 1 shows a modified group used in the low molecular polysiloxane compound represented by formula (1), a modified group used in the high molecular polysiloxane compound represented by formula (2), the number of the modified groups per molecule, the number of repeating units and the kinematic viscosity at 25° C. of the low molecular polysiloxane compound, as well as the number of the modified groups per molecule, the number of repeating units and the kinematic viscosity at 25° C. of the high molecular polysiloxane compound.

As the modified group in the low molecular polysiloxane compound, a polyether amino group or a substituent represented by the following formula (7) was used, and as the modified group in the high molecular polysiloxane compound represented by formula (2), a substituent represented by the following formula (7) or a substituent represented by the following formula (8) was used. Additionally, both of substituent R$^1$ and substituent R$^2$ other than the modified groups are methyl groups.

Moreover, in comparative examples 1 to 3, the low molecular polysiloxane compound and the high molecular polysiloxane compound were not mixed with each other, and the polysiloxane compound is used individually.

[Formula 13]

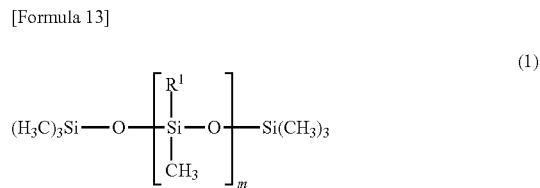
(1)

[Formula 14]

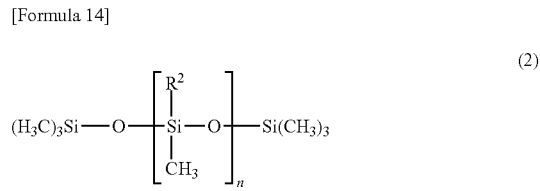
(2)

[Formula 15]

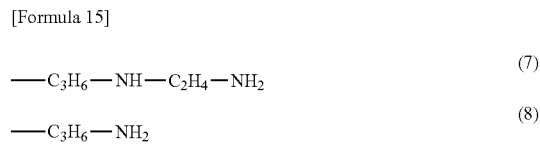

$$—C_3H_6—NH—C_2H_4—NH_2 \quad (7)$$

$$—C_3H_6—NH_2 \quad (8)$$

TABLE 1

| | Low molecular polysiloxane compound | | | | High molecular polysiloxane compound | | | |
|---|---|---|---|---|---|---|---|---|
| | Amino-modified group | Number of modified groups | Amino-modified group (m) | Number of modified groups (mm²/s) | Amino-modified group | Number of modified groups | Amino-modified group (m) | Number of modified groups (mm²/s) |
| Example 1 | Polyether amino group | 0.10 | 20 | 15 | Formula(7) | 1.12 | 40 | 40 |
| Example 2 | Formula(7) | 2.04 | 30 | 50 | Formula(7) | 1.16 | 130 | 250 |
| Example 3 | Formula(7) | 1.12 | 40 | 40 | Formula(7) | 1.16 | 130 | 250 |
| Example 4 | Formula(7) | 1.12 | 40 | 40 | Formula(7) | 1.00 | 280 | 900 |
| Example 5 | Formula(7) | 1.12 | 40 | 40 | Formula(7) | 1.02 | 300 | 1000 |
| Example 6 | Formula(7) | 1.12 | 40 | 40 | Formula(7) | 2.09 | 620 | 5000 |
| Example 7 | Formula(7) | 1.12 | 40 | 40 | Formula(7) | 1.08 | 800 | 10000 |
| Example 8 | Formula(7) | 1.12 | 40 | 40 | Formula(8) | 5.31 | 1360 | 80000 |
| Example 9 | Formula(7) | 1.14 | 80 | 150 | Formula(7) | 1.00 | 280 | 900 |
| Example 10 | Formula(7) | 1.16 | 130 | 250 | Formula(7) | 1.02 | 300 | 1000 |
| Example 11 | Formula(7) | 2.83 | 200 | 450 | Formula(8) | 2.09 | 620 | 5000 |
| Example 12 | Formula(7) | 2.83 | 200 | 450 | Formula(8) | 5.31 | 1360 | 80000 |
| Example 13 | Formula(7) | 3.00 | 34 | 70 | Formula(7) | 1.16 | 130 | 250 |
| Example 14 | Formula(7) | 3.00 | 34 | 70 | Formula(8) | 5.31 | 1360 | 80000 |
| Example 15 | Formula(7) | 3.00 | 34 | 70 | Formula(8) | 5.86 | 1430 | 100000 |
| Comparative Example 1 | Formula(7) | 1.12 | 40 | 40 | — | — | — | — |
| Comparative Example 2 | — | — | — | — | Formula(7) | 1.02 | 300 | 1000 |
| Comparative Example 3 | — | — | — | — | Formula(8) | 5.31 | 1360 | 80000 |
| Comparative Example 4 | Polyether amino group | 2.04 | 30 | 50 | Formula(7) | 1.12 | 40 | 40 |
| Comparative Example 5 | Polyether amino group | 1.12 | 40 | 40 | Formula(8) | 0.52 | 60 | 70 |
| Comparative Example 6 | Formula(7) | 1.00 | 280 | 900 | Formula(7) | 2.09 | 620 | 5000 |
| Comparative Example 7 | Formula(7) | 3.50 | 40 | 90 | Formula(7) | 1.00 | 280 | 900 |
| Comparative Example 8 | Formula(7) | 1.12 | 40 | 40 | Formula(7) | 11.0 | 280 | — |

(Evaluation Method)
1. Cylinder Evaluation 1

Each of anti-soiling agent compositions of examples 1 to 15 and comparative examples 1 to 8 was sprayed on a cylinder D1 of a cylindrical dryer (dry part, made by Kobayashi Engineering Works., Ltd.) shown in FIG. 1 at a rate of 5 ml/min, and after having been operated for 8 hours, the weight of pitch dropped below the cylinder D1 was measured. The results obtained are shown in Table 2. Additionally, in Table 2, with respect to comparative example 3, since the surface of the cylinder D1 became sticky to cause an extreme increase in the amount of pitch, the evaluation was terminated.

2. Cylinder Evaluation 2

A doctor blade is attached to a cylinder D3 of the cylindrical dryer shown in FIG. 1 so as to make its blade edge in contact with the surface thereof. Thus, when the cylindrical dryer was operated, pitch adhered to the cylinder D3 was scraped off and collected by the blade edge of the doctor blade.

Then, onto the cylinder D1, each of the anti-soiling agent compositions of examples 1 to 15 and comparative examples 1 to 8 was sprayed at a rate of 5 ml/min, and after having been operated for 8 hours, the weight of pitch accumulated on the blade edge of the doctor blade was measured. The results obtained are shown in Table 2. Additionally, in Table 2, with respect to comparative example 3, since the surface of the cylinder D1 became sticky to cause an extreme increase in the amount of pitch, the evaluation was terminated.

3. Canvas Evaluation 1

Onto a canvas K1 of a cylindrical dryer shown in FIG. 1, each of the anti-soiling agent compositions of examples 1 to 15 and comparative example 1 to 8 was sprayed at a rate of 5 ml/min, and the dryer was operated for one week.

Then, the number of adhered pitch spots having a diameter of 5 mm or more per 1 m² of the canvas K1 was measured. The results obtained are shown in Table 2. Additionally, in Table 2, with respect to comparative example 3, since the surface of the canvas K1 became sticky to cause an extreme increase in the amount of pitch, the evaluation was terminated.

4. Canvas Evaluation 2

Onto a canvas K1 of a cylindrical dryer shown in FIG. 1, each of the anti-soiling agent compositions of examples 1 to 15 and comparative example 1 to 8 was sprayed at a rate of 5 ml/min, and the dryer was operated for one week.

Then, the pitch adhered to an out roll KR1 for guiding the canvas K1 was scraped off and the weight of the pitch was measured. The results obtained are shown in Table 2. Additionally, in Table 2, with respect to comparative example 3, since the surface of the out roll KR1 became sticky to cause an extreme increase in the amount of pitch, the evaluation was terminated.

TABLE 2

| | Cylinder evaluation 1 (g) | Cylinder evaluation 2 (g) | Canvas evaluation 1 (piece) | Canvas evaluation 2 (piece) |
|---|---|---|---|---|
| Example 1 | 48.1 | 20.8 | 1 | 3.3 |
| Example 2 | 45.9 | 19.9 | 0 | 3.1 |
| Example 3 | 40.4 | 18.0 | 0 | 2.2 |
| Example 4 | 32.1 | 10.2 | 0 | 5.0 |
| Example 5 | 27.5 | 9.8 | 2 | 7.8 |
| Example 6 | 25.6 | 9.6 | 3 | 8.2 |
| Example 7 | 23.2 | 7.4 | 3 | 10.3 |
| Example 8 | 20.8 | 4.5 | 3 | 10.5 |
| Example 9 | 26.3 | 10.7 | 5 | 15.8 |
| Example 10 | 28.1 | 11.7 | 5 | 16.4 |
| Example 11 | 30.9 | 15.2 | 5 | 16.9 |
| Example 12 | 31.9 | 22.0 | 5 | 18.2 |
| Example 13 | 24.6 | 14.8 | 2 | 5.1 |

TABLE 2-continued

| | Cylinder evaluation 1 (g) | Cylinder evaluation 2 (g) | Canvas evaluation 1 (piece) | Canvas evaluation 2 (piece) |
|---|---|---|---|---|
| Example 14 | 27.7 | 15.1 | 5 | 19.0 |
| Example 15 | 58.1 | 28.9 | 8 | 24.4 |
| Comparative Example 1 | 127.9 | 47.2 | 48 | 98.5 |
| Comparative Example 2 | 104.5 | 39.3 | 29 | 58.7 |
| Comparative Example 3 | — | — | — | — |
| Comparative Example 4 | 124.3 | 50.1 | 18 | 39.1 |
| Comparative Example 5 | 151.1 | 49.8 | 21 | 39.5 |
| Comparative Example 6 | 73.8 | 22.7 | 25 | 35.4 |
| Comparative Example 7 | 125.6 | 45.4 | 19 | 38.2 |
| Comparative Example 8 | 170.2 | 62.5 | 33 | 60.1 |

Examples 16 to 58

To water were added 6.0% by weight of a low molecular polysiloxane compound represented by the following formula (1), 4.0% by weight of a high molecular polysiloxane compound represented by the following formula (2) and 2.0% by weight of polyethylene decyl ether (emulsifier), and stirred by a mixer so that an anti-soiling agent composition was obtained.

As the modified group in the low molecular polysiloxane compound, a substituent represented by the following formula (3), a substituent represented by the following formula (9), an epoxy-modified group, a polyether-modified group, a carboxyl-modified group or a phenyl-modified group was used, and as the modified group in the high molecular polysiloxane compound, a substituent represented by the following formula (5), a substituent represented by the following formula (6), a substituent represented by the following formula (10), an epoxy-modified group, a polyether-modified group, a carboxyl-modified group or a phenyl-modified group was used. Additionally, both of substituent $R^1$ and substituent $R^2$ other than the modified groups are methyl groups.

The modified groups thus used are shown in Table 3.

[Formula 16]

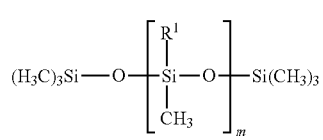

(1)

[Formula 17]

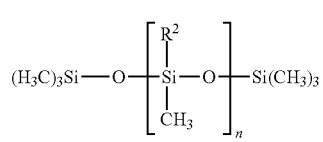

(2)

[Formula 18]

(3)

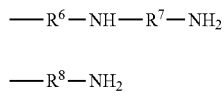

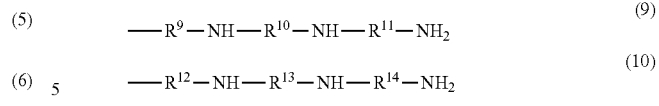

TABLE 3

| | Low molecular polysiloxane compound | | High molecular polysiloxane compound | |
|---|---|---|---|---|
| | Modified group | Substituent | Modified group | Substituent |
| Example 16 | Formula (3) | $R^3$ = ethylene group, $R^4$ = propylene group | Formula (5) | $R^6$ = propylene group, $R^7$ = ethylene group |
| Example 17 | Formula (3) | $R^3$ = propylene group, $R^4$ = propylene group | Formula (5) | $R^6$ = propylene group, $R^7$ = ethylene group |
| Example 18 | Formula (3) | $R^3$ = ethylene group, $R^4$ = ethylene group | Formula (5) | $R^6$ = propylene group, $R^7$ = ethylene group |
| Example 19 | Formula (3) | $R^3$ = methylene group, $R^4$ = ethylene group | Formula (5) | $R^6$ = propylene group, $R^7$ = ethylene group |
| Example 20 | Formula (3) | $R^3$ = n-butylene group, $R^4$ = ethylene group | Formula (5) | $R^6$ = propylene group, $R^7$ = ethylene group |
| Example 21 | Formula (3) | $R^3$ = propylene group, $R^4$ = methylene group | Formula (5) | $R^6$ = propylene group, $R^7$ = ethylene group |
| Example 22 | Formula (3) | $R^3$ = propylene group, $R^4$ = n-butylene group | Formula (5) | $R^6$ = propylene group, $R^7$ = ethylene group |
| Example 23 | Formula (3) | $R^3$ = propylene group, $R^4$ = ethylene group | Formula (5) | $R^6$ = ethylene group, $R^7$ = propylene group |
| Example 24 | Formula (3) | $R^3$ = propylene group, $R^4$ = ethylene group | Formula (5) | $R^6$ = propylene group, $R^7$ = propylene group |
| Example 25 | Formula (3) | $R^3$ = propylene group, $R^4$ = ethylene group | Formula (5) | $R^6$ = ethylene group, $R^7$ = ethylene group |
| Example 26 | Formula (3) | $R^3$ = propylene group, $R^4$ = ethylene group | Formula (5) | $R^6$ = methylene group, $R^7$ = ethylene group |
| Example 27 | Formula (3) | $R^3$ = propylene group, $R^4$ = ethylene group | Formula (5) | $R^6$ = n-butylene group, $R^7$ = ethylene group |
| Example 28 | Formula (3) | $R^3$ = propylene group, $R^4$ = ethylene group | Formula (5) | $R^6$ = propylene group, $R^7$ = methylene group |
| Example 29 | Formula (3) | $R^3$ = propylene group, $R^4$ = ethylene group | Formula (5) | $R^6$ = propylene group, $R^7$ = n-butylene group |
| Example 30 | Formula (3) | $R^3$ = propylene group, $R^4$ = ethylene group | Formula (6) | $R^8$ = methylene group |
| Example 31 | Formula (3) | $R^3$ = propylene group, $R^4$ = ethylene group | Formula (6) | $R^8$ = ethylene group |
| Example 32 | Formula (3) | $R^3$ = propylene group, $R^4$ = ethylene group | Formula (6) | $R^8$ = n-butylene group |
| Example 33 | Formula (9) | $R^9$ = propylene group, $R^{10}$ = propylene group, $R^{11}$ = ethylene group | Formula (6) | $R^8$ = propylene group |
| Example 34 | Formula (3) | $R^3$ = propylene group, $R^4$ = ethylene group | Formula (10) | $R^{12}$ = propylene group, $R^{13}$ = propylene group, $R^{14}$ = ethylene group |
| Example 35 | epoxy | | Formula (5) | $R^6$ = propylene group, $R^7$ = ethylene group |
| Example 36 | polyether | | Formula (5) | $R^6$ = propylene group, $R^7$ = ethylene group |
| Example 37 | carboxyl | | Formula (5) | $R^6$ = propylene group, $R^7$ = ethylene group |
| Example 38 | phenyl | | Formula (5) | $R^6$ = propylene group, $R^7$ = ethylene group |
| Example 39 | Formula (3) | $R^3$ = propylene group, $R^4$ = ethylene group | epoxy | |
| Example 40 | Formula (3) | $R^3$ = propylene group, $R^4$ = ethylene group | polyether | |
| Example 41 | Formula (3) | $R^3$ = propylene group, $R^4$ = ethylene group | carboxyl | |
| Example 42 | Formula (3) | $R^3$ = propylene group, $R^4$ = ethylene group | phenyl | |
| Example 43 | epoxy | | epoxy | |
| Example 44 | epoxy | | polyether | |
| Example 45 | epoxy | | carboxyl | |
| Example 46 | epoxy | | phenyl | |
| Example 47 | polyether | | epoxy | |
| Example 48 | polyether | | polyether | |
| Example 49 | polyether | | carboxyl | |
| Example 50 | polyether | | phenyl | |
| Example 51 | carboxyl | | epoxy | |
| Example 52 | carboxyl | | polyether | |
| Example 53 | carboxyl | | carboxyl | |

TABLE 3-continued

|  | Low molecular polysiloxane compound | | High molecular polysiloxane compound | |
|---|---|---|---|---|
|  | Modified group | Substituent | Modified group | Substituent |
| Example 54 | carboxyl | | phenyl | |
| Example 55 | phenyl | | epoxy | |
| Example 56 | phenyl | | polyether | |
| Example 57 | phenyl | | carboxyl | |
| Example 58 | phenyl | | phenyl | |

(Evaluation Method)

The above-mentioned cylinder evaluation 1, cylinder evaluation 2, canvas evaluation 1 and canvas evaluation 2 were carried out on each of the anti-soiling agent compositions obtained in examples 16 to 58.

In cylinder evaluation 1 and cylinder evaluation 2, in order to carry out the same processes as those of example 8, the evaluations were executed under conditions that the number of modified groups per molecule of the low molecular polysiloxane compound represented by formula (1) in each of the anti-soiling agent compositions of examples 16 to 58 was adjusted to 1.12, the number m of repeating units was adjusted to 40, and the kinematic viscosity at 25° C. was adjusted to 40 mm$^2$/s, and that the number of modified groups per molecule of the high molecular polysiloxane compound represented by formula (2) therein was adjusted to 5.31, the number n of repeating units was adjusted to 1360, and the kinematic viscosity at 25° C. was adjusted to 80000 mm$^2$/s In canvas evaluation 1 and canvas evaluation 2, in order to carry out the same processes as those of example 3, the evaluations were executed under conditions that the number of modified groups per molecule of the low molecular polysiloxane compound represented by formula (1) in each of the anti-soiling agent compositions of examples 16 to 58 was adjusted to 1.12, the number m of repeating units was adjusted to 40, and the kinematic viscosity at 25° C. was adjusted to 40 mm$^2$/s, and that the number of modified groups per molecule of the high molecular polysiloxane compound represented by formula (2) therein was adjusted to 1.16, the number n of repeating units was adjusted to 130, and the kinematic viscosity at 25° C. was adjusted to 250 mm$^2$/s Table 4 shows the results thus obtained. The table also again shows the results obtained by using the anti-soiling agent compositions of example 3 and example 8.

TABLE 4

|  | Cylinder evaluation 1 (g) | Cylinder evaluation 2 (g) | Canvas evaluation 1 (piece) | Canvas evaluation 2 (piece) |
|---|---|---|---|---|
| Example 3 | | | 0 | 2.2 |
| Example 8 | 20.8 | 4.5 | | |
| Example 16 | 22.2 | 5.5 | 0 | 3.2 |
| Example 17 | 24.5 | 6.0 | 0 | 4.1 |
| Example 18 | 25.3 | 6.0 | 0 | 4.0 |
| Example 19 | 29.9 | 8.2 | 2 | 8.2 |
| Example 20 | 26.5 | 6.8 | 1 | 5.3 |
| Example 21 | 27.2 | 7.2 | 1 | 5.9 |
| Example 22 | 26.5 | 6.8 | 1 | 5.3 |
| Example 23 | 22.2 | 5.5 | 0 | 3.2 |
| Example 24 | 24.5 | 6.0 | 0 | 4.1 |
| Example 25 | 25.3 | 6.0 | 0 | 4.0 |
| Example 26 | 29.9 | 8.2 | 2 | 8.2 |
| Example 27 | 26.5 | 6.8 | 1 | 5.3 |
| Example 28 | 27.2 | 7.2 | 1 | 5.9 |
| Example 29 | 26.5 | 6.8 | 1 | 5.3 |
| Example 30 | 31.5 | 10.1 | 4 | 9.8 |
| Example 31 | 30.9 | 9.6 | 3 | 8.5 |
| Example 32 | 30.1 | 9.1 | 3 | 8.3 |
| Example 33 | 32.9 | 13.9 | 5 | 10.6 |
| Example 34 | 32.6 | 14.1 | 5 | 10.5 |
| Example 35 | 25.5 | 6.8 | 6 | 11.3 |
| Example 36 | 24.7 | 6.7 | 5 | 11.7 |
| Example 37 | 25.3 | 6.9 | 6 | 11.9 |
| Example 38 | 25.8 | 7.1 | 7 | 12.2 |
| Example 39 | 31.1 | 15.0 | 3 | 9.3 |
| Example 40 | 30.5 | 15.2 | 4 | 9.5 |
| Example 41 | 31.8 | 15.4 | 4 | 9.2 |
| Example 42 | 32.1 | 15.7 | 6 | 9.9 |
| Example 43 | 32.5 | 15.2 | 5 | 12.0 |
| Example 44 | 33.1 | 15.0 | 6 | 12.2 |
| Example 45 | 32.5 | 15.3 | 5 | 11.9 |
| Example 46 | 33.6 | 16.0 | 7 | 12.9 |
| Example 47 | 33.0 | 15.2 | 5 | 11.8 |
| Example 48 | 33.4 | 15.4 | 6 | 12.2 |
| Example 49 | 32.9 | 14.8 | 6 | 11.9 |
| Example 50 | 33.9 | 15.8 | 8 | 13.4 |
| Example 51 | 32.6 | 15.0 | 5 | 12.0 |
| Example 52 | 33.1 | 15.1 | 6 | 12.3 |
| Example 53 | 33.2 | 15.3 | 6 | 11.9 |
| Example 54 | 34.0 | 16.0 | 8 | 13.7 |
| Example 55 | 33.7 | 15.8 | 6 | 13.0 |
| Example 56 | 34.2 | 16.0 | 8 | 13.3 |
| Example 57 | 34.2 | 16.3 | 7 | 12.8 |
| Example 58 | 35.3 | 16.8 | 10 | 14.2 |

The results indicate that the anti-soiling agent composition of the present invention makes it possible to sufficiently prevent pitch adhesion onto the dry part region.

INDUSTRIAL APPLICABILITY

The anti-soiling agent composition of the present invention is applied to a dry part region and used during paper-making processes. In accordance with the anti-soiling agent composition, since the pitch adhesion onto the dry part region can be prevented, it is possible to efficiently improve the yield in the paper production.

EXPLANATION OF REFERENCE NUMERALS

B . . . Breaker stack roll
C . . . Calender roll
D . . . Dry part
D1, D2, D3, D4, D5, D6, D7, D8 . . . Cylinder
K1, K2 . . . Canvas
KR . . . Canvas roll
KR1 . . . Out roll
W . . . Paper body

The invention claimed is:
1. A method of using an anti-soiling agent composition for preventing pitch contamination in a dry part of a papermaking process, the method comprising:
applying the anti-soiling agent composition to cylinders of the dry part for use therein, wherein the anti-soiling agent composition comprises:
a low molecular polysiloxane compound for dispersing pitch, represented by the following formula (1); and
a high molecular polysiloxane compound for use in forming a coat film on the dry part, represented by the following formula (2),
wherein the low molecular polysiloxane compound has a kinematic viscosity at 25° C. in a range from 10 to 300 mm²/s, while the high molecular polysiloxane compound has a kinematic viscosity at 25° C. in a range from 40 to 90000 mm²/s,
wherein the modified group in the low molecular polysiloxane compound is an amino-modified group or a polyether-modified group and the modified group in the high molecular polysiloxane compound is an amino-modified group or a polyether-modified group,
wherein the number of modified groups per low molecular polysiloxane compound is in a range from 0.1 to 2.0 and the number of modified groups per high molecular polysiloxane compound is in a range from 1.0 to 6.0, and the number m of repeating polysiloxane units in the low molecular polysiloxane compound and the number n of repeating polysiloxane units in the high molecular polysiloxane compound have the following relationship: 2 m≤n,
wherein the high molecular polysiloxane compound has a compounding ratio in a range from 1 to 20% by weight, the low molecular polysiloxane compound has a compounding ratio in a range from 5 to 20% by weight, and the low molecular polysiloxane compound has a compounding ratio in a range from 0.1 to 10 parts by weight relative to 1 part by weight of the high molecular polysiloxane compound,
wherein the anti-soiling agent composition is sprayed to the cylinders by using a spraying nozzle so that the sprayed amount thereof per unit area of paper passing therethrough is set in a range from 10 μg/m² to 1000 μg/m² as a solid component of the polysiloxane compound,

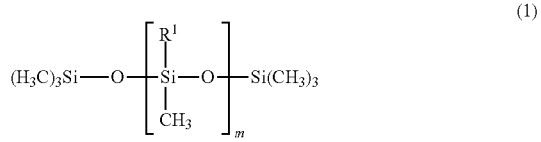

(1)

wherein substituent $R^1$ represents a methyl group or a modified group, with the repeating number m being set to an integer from 20 to 50, and

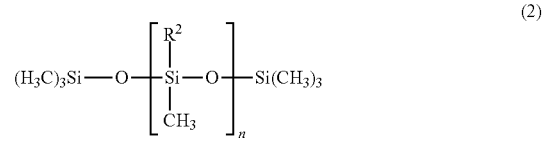

(2)

wherein substituent $R^2$ represents a methyl group or a modified group, with the repeating number n representing an integer of 280 or more and less than 1430.

2. The method according to claim 1, wherein the modified group in the low molecular polysiloxane compound is represented by the following formula (3),

(3)

wherein a substituent $R^3$ represents a propylene group and a substituent $R^4$ represents an ethylene group.

3. The method according to claim 1, wherein the modified group in the low molecular polysiloxane compound is represented by the following formula (4),

(4)

wherein a substituent $R^5$ represents an alkylene group having 1 to 6 carbon atoms.

4. The method according to claim 1, wherein the modified group in the high molecular polysiloxane compound is represented by the following formula (5),

(5)

wherein a substituent $R^6$ represents a propylene group and a substituent $R^7$ represents an ethylene group independently.

5. The method according to claim 1, wherein the modified group in the high molecular polysiloxane compound is represented by the following formula (6),

(6)

wherein a substituent $R^8$ represents an alkylene group having 1 to 6 carbon atoms.

6. The method according to claim 1, wherein the anti-soiling agent composition further comprises an emulsifier for emulsifying the low molecular polysiloxane compound and the high molecular polysiloxane compound.

7. The method according to claim 6, wherein the emulsifier has a compounding ratio in a range from 0.05 to 0.4 parts by weight relative to 1 part by weight of a mixture of the high molecular polysiloxane compound and the low molecular polysiloxane compound.

* * * * *